(12) United States Patent
Bondi

(10) Patent No.: US 7,908,119 B2
(45) Date of Patent: Mar. 15, 2011

(54) SYSTEM AND METHOD FOR AUTOMATING THE ANALYSIS OF COMPUTER SYSTEM LOAD TESTING

(75) Inventor: Andre B. Bondi, Red Bank, NJ (US)

(73) Assignee: Siemens Corporation, Iselin, NJ (US)

( * ) Notice: Subject to any disclaimer, the term of this patent is extended or adjusted under 35 U.S.C. 154(b) by 336 days.

(21) Appl. No.: 12/016,262

(22) Filed: Jan. 18, 2008

(65) Prior Publication Data

US 2008/0208536 A1    Aug. 28, 2008

Related U.S. Application Data

(60) Provisional application No. 60/891,094, filed on Feb. 22, 2007.

(51) Int. Cl.
*G21C 17/00* (2006.01)

(52) U.S. Cl. ......... 702/186; 702/182; 702/183; 702/185; 702/187; 702/179

(58) Field of Classification Search ............ 702/186
See application file for complete search history.

(56) References Cited

U.S. PATENT DOCUMENTS

| | | | |
|---|---|---|---|
| 2005/0182589 A1* | 8/2005 | Smocha et al. | 702/121 |
| 2007/0288226 A1* | 12/2007 | Higeta et al. | 703/24 |

OTHER PUBLICATIONS

Mathews, Module for Numerical Differentiation, Part II, Richardson's Extrapolation (2004).*
Zhang, Introduction to numerical Methods, Richardson's Extrapolation (I) (2006).*
Pachenko, Statistics for Applications, Section 13: Kolmogorov-Smirnov test (2006).*

* cited by examiner

*Primary Examiner* — Drew A Dunn
*Assistant Examiner* — Hyun Park

(57) ABSTRACT

A method for analyzing load run test results of a computer system includes providing a plurality of performance measure sets derived from a first series of load run tests performed over a same time period. Each set comprises a plurality of records and each record has a timestamp and a value. Performance measure records are sorted by value in ascending order, for each performance measure set. Plateau regions are identified in the sorted performance measure sets, for each performance measure. Performance measure records are sorted within each plateau region by time stamp in ascending order, for each performance measure. Overlapping time intervals covered by the plateau regions are identified for the plurality of performance measure sets, and averages of performance measures are computed over the overlapping time intervals.

28 Claims, 17 Drawing Sheets

Figure 2: Offered transaction rate vs. time for one load generator.

Figure 3: CPU utilization vs. time.

Figure 4: Average response time vs. time.

Figure 5: Estimates of the first and second derivatives of the sorted offered transaction rate curve.

Figure 6: Sorted CPU utilizations and the corresponding derivative estimates.

Figure 7: Cumulative plot of the CPU utilization.

Figure 8: Histogram and corresponding cumulative plot for CPU Pct Busy.

Figure 9: Sorted average response times and the corresponding derivatives.

Figure 10: Sorted performance observations and corresponding timestamps.

Figure 11: Ascending CPU utilization over time, oscillation of inbound and outbound packet rates.

Figure 12: Sorted CPU utilizations. Note the absence of a plateau and the oscillating derivatives.

Figure 13: Inbound packet rates in ascending order. The two plateaus correspond to the extremes of the oscillations. The small values of the second derivatives correspond to the sloping plateaus.

Figure 14: Cumulative relative frequency of inbound packet rates.

Figure 15: Partial time stamp tree corresponding to the data in Figure 10.
The oval numbers correspond to those in Figure 10.

SYSTEM AND METHOD FOR AUTOMATING THE ANALYSIS OF COMPUTER SYSTEM LOAD TESTING

CROSS REFERENCE TO RELATED UNITED STATES APPLICATIONS

This application claims priority from "Method and Procedure for Automatically Comparing Load Test Runs", U.S. Provisional Application No. 60/891,094 of Andre Bondi, filed Feb. 22, 2007, the contents of which are herein incorporated by reference.

TECHNICAL FIELD

This disclosure is directed to automatically analyzing and comparing load test data on computer systems before and after a modification and conducted under identical load conditions.

DISCUSSION OF THE RELATED ART

Load testing is a common technique for evaluating the performance of a computer system. To predict system performance as a function of load, the system under test (SUT) should be subjected to a constant load for a fixed time interval. This procedure is repeated at for increasing load levels, perhaps until one or more components of the system is saturated. The analysis of the load test outputs is inherently labor-intensive. For systems based on service-oriented and modular architectures with large numbers of use cases, the amount of data to be analyzed is so large that rapid, timely analysis of the measurements is usually infeasible.

The average values of such performance and resource usage measures are plotted as functions of the load to verify system scalability and to identify saturation points. Examples of resource usage measures include processor utilization, bandwidth utilization, and memory occupancy. Examples of performance measures include throughput and transaction response time. All of these will be collectively referred to herein below as performance measures for the sake of convenience.

The averages for a given load level are only meaningful if they are drawn from a system that has reached equilibrium, and if the load test has been run long enough at constant load to include a large time interval when this is the case. The term equilibrium is used as when describing a stochastic process such as a continuous time Markov chain. Such a process is said to be in equilibrium or steady state when the rates of change of the state probabilities approach zero. A computer system can only achieve equilibrium and deliver results with adequately low response times if the load it is offered results in average resource utilizations that are all strictly less than 100%.

Only the observations occurring during a period when the system is in equilibrium should be included in the calculations of the corresponding average values of the performance measures of interest. Failure to reach equilibrium may indicate saturation or system instability, perhaps caused by such phenomena as memory leaks, scheduling errors, or concurrent programming errors.

The extraction of average values of the performance measures is similar to (a) the extraction of equilibrium average values of performance predictions from a discrete event simulation, and (b) determination of whether the simulated system achieved equilibrium at all. The equilibrium values do not include the observations gathered during the warm-up time and before the cool-down time.

One can dynamically determine the length of a simulation run by suspending the simulation and determining whether the confidence bounds are sufficiently narrow to warrant stopping the simulation altogether. If the state space is simple enough, one can identify regeneration points (such as a system being empty and idle) that delimit intervals that may be regarded as statistically independent of one another, and use the measures derived from them to estimate confidence bounds on the performance measures. After running the simulation for a predetermined length of simulated time, one can use the method of batched means to determine confidence bounds on the various performance measures. Observed transients due to warm-up may be eliminated from the batches by hand.

A discrete event simulation, unlike a computer system, can be frozen for statistics gathering and computation with its state intact at any arbitrary instant. The computation of the statistics does not affect the predicted performance of the simulated system. By contrast, in a load test of a computer system, the measured system itself is the source of data on resource usage. A load test of a computer system must be continued while a decision is made whether to stop it, because its state cannot be frozen at the instant statistics are gathered. Stopping the offered load while a decision is being made will not prevent the system from proceeding with its ongoing work. Indeed, suspending the generation of load to the SUT will trigger a spurious cool-down period. Moreover, gathering that data and transmitting it to a central analysis point while the experiment is in progress consume the very resources that are being measured. Therefore, dynamic determination of the suitability of the confidence bounds could be cumbersome.

The regenerative method is unsuitable for analyzing a complex computer system because the costs of identifying the regeneration points, verifying that they have been reached, and storing the corresponding data are too high. Finally, regeneration points may not occur with sufficient frequency to be useful in systems with heavy loads.

SUMMARY OF THE INVENTION

Exemplary embodiments of the invention as described herein generally include methods and systems for automatically determining whether the equilibrium is achieved during a load test and the period during which equilibrium occurred, and automating the analysis of the outputs of load tests of computer systems. The analysis methods can (1) determine that the system behaves smoothly under various levels of sustained constant load, (2) flag test run results that indicate that the system does not achieve a steady state under a constant load, and (3) automatically identify systems at least some of whose performance measures oscillate under constant load. Without an automated method, the observations must be manually chosen for inclusion in the averages of performance measures. This is labor intensive and potentially subjective. Without an automatic method, timely data reduction of the results of performance tests of complex systems and service-oriented architectures (SOAs) with dozens or even hundreds of use cases and mixes of use cases would be infeasible.

A method according to an embodiment of the invention indicates whether the test run contained distinct periods of equilibrium with different performance levels, whether the system might have been oscillating between performance regions, and whether any performance measures exhibited upward or downward trends. All of these characteristics are signs of (potential) system instability. A method according to an embodiment of the invention assumes that the performance usage measures of a well behaved, stable system under constant load usually lie within small ranges, and that the observations within these ranges are the majority of the values collected during the test run.

According to another embodiment of the invention, the empirical distribution functions of the observations of designated performance measures can be used to check whether a system modification has resulted in improvement or degradation of the system. The premise is that if the empirical distribution functions of the observations do not differ significantly before and after the modification, the modification has had no significant impact. If the empirical distribution functions do differ, one should check the performance measures to see what the impact of the modification was. In this way, one can rapidly and automatically determine the impact of the system modification on performance.

According to an aspect of the invention, there is provided a method for analyzing load run test results of a computer system, the method including providing a plurality of performance measure sets derived from a first series of load run tests performed over a same time period, each the set comprising a plurality of records, each record having a timestamp and a value, sorting performance measure records by value in ascending order, for each performance measure set, identifying plateau regions in the sorted performance measure sets, for each performance measure, sorting performance measure records within each plateau region by time stamp in ascending order, for each performance measure, identifying overlapping time intervals covered by the plateau regions for the plurality of performance measure sets, and computing averages of performance measures over the overlapping time intervals.

According to a further aspect of the invention, identifying a plateau region in a sorted performance measure set comprises looking for an unbroken sequence of measurement values where estimates of a first derivative and a second derivative for each value in the sequence are close to zero in absolute value.

According to a further aspect of the invention, a difference between a smallest value and a largest value of the measurement values in the unbroken sequence is small.

According to a further aspect of the invention, a first derivative $\hat{f}'(x_n)$ at a measurement value $f(x_n)$ is estimated by the formula $$\hat{f}'(x_n) = \frac{1}{12}[f(x_{n-2}) - 8f(x_{n-1}) + 8f(x_{n+1}) - f(x_{n+2})], n \geq 2.$$

According to a further aspect of the invention, a second derivative $\hat{f}''(x_n)$ at a measurement value $\hat{f}'''(x_n)$ is estimated by the formula $\hat{f}''(x_n)=[f(x_{n-1})-2f(x_n)+f(x_{n+1})]$.

According to a further aspect of the invention, a measurement value for a first point $x_0$ in the plateau satisfies $|\hat{f}'(x_0)|<\epsilon_1$ and $|\hat{f}''(x_0)|<\epsilon_2$, where $\hat{f}'$, $\hat{f}''$ are first and second derivatives of the measurement values, respectively, and $\epsilon_1, \epsilon_2>0$.

According to a further aspect of the invention, a measurement value for a subsequent point $x_{n+1}$ in the plateau satisfies $|\hat{f}'(x_{n+1})|<\epsilon_1$, $|\hat{f}''(x_{n+1})|<\epsilon_2$, and $|f(x_{n+1})-f(x_n)|<\epsilon_3$, for $\epsilon_i>0$, i=1, 2, 3.

According to a further aspect of the invention, the method includes excluding a point from the plateau, if a first derivative evaluated for the point is negative.

According to a further aspect of the invention, identifying overlapping time intervals covered by the plateau regions comprises, if a measurement value for an interval is missing for one performance measure, discarding corresponding measurement values for other performance measures, computing averages of performance measures over a largest set for which all measurement values are present and sufficiently close together, where chronologically successive measurement values within the plateau sets of the different performance measures are deemed to be sufficiently close together if the measurement values are no more than kδ apart, where k is a small positive integer and δ is a length of measurement intervals.

According to a further aspect of the invention, the performance measures are based on rates, sample statistics, and time-averaged quantities.

According to a further aspect of the invention, the performance measures include processor utilization, bandwidth utilization, memory occupancy, throughput and transaction response time According to a further aspect of the invention, the method includes providing one or more performance measure sets derived from a second series of load run tests performed after modifying the computer system, the second series of load run tests being performed over the same time period and under the same load conditions as the first series of load run tests, for each performance measure in the second series of load run tests, sorting measurement values of each the performance measure from the first series load run test and from the second series load run test by value, computing a first and second empirical distribution function for the first and second set of sorted data, and comparing the first and second empirical distribution functions using a Kolmogorov-Smirnov test, and identifying those pairs of runs that are different according to the Kolmogorov-Smirnov test as needing further investigation.

According to a further aspect of the invention, the empirical distribution function is defined by $F(x)=i/n$ if $x(i)\leq x$, $x(i+1)>x$ and $i=1, 2, \ldots, n-1$, and $F(x)=1$ if $x \geq x(n)$, where n is a number of measurement values.

According to another aspect of the invention, there is provided a program storage device readable by a computer, tangibly embodying a program of instructions executable by the computer to perform the method steps for analyzing load run test results of a computer system.

DETAILED DESCRIPTION OF EXEMPLARY EMBODIMENTS

Figure 1:
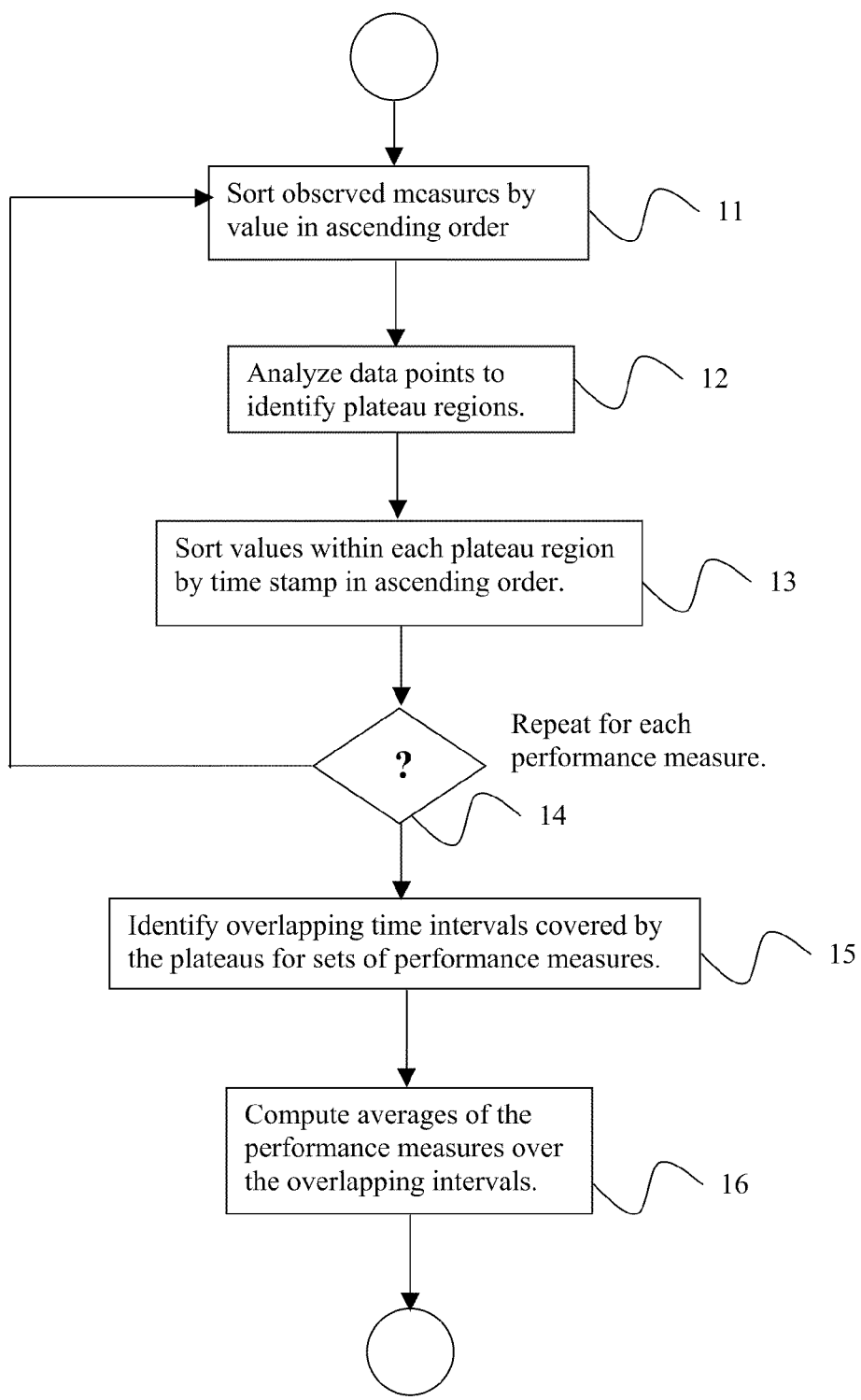
FIG. 1 is a flowchart of an algorithm for automatically analyzing load run tests, according to an embodiment of the invention.

Exemplary embodiments of the invention as described herein generally include systems and methods for automatically analyzing and comparing load test data on computer systems. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

A method according to an embodiment of the invention is based on the premise that the observed values of the performance measures vary little when the system is in equilibrium under constant load. The observations of each performance measure are sorted, and observations with common timestamps within the plateaus of the resulting sorted curves are selected to compute the average performance measures. Criteria for selection are discussed herein below. A method according to an embodiment of the invention can analyze multiple time series of performance measures in situations in which the control of the experimental environment is very tight. In particular, environmental conditions and the offered load should be held constant for the entire duration of the test. Also, the length of the test run must be long compared with the anticipated lengths of the ramp-up or warm-up and cool-down times. System load tests in a laboratory environment and discrete event simulations fit these criteria.

Structure of a Typical Load Testing Environment

In a typical load testing environment, load generators (also known as clients) are connected to the system under test (SUT) via a network. Ideally, the load generators are deployed on enough individual workstations to run test scripts to generate transactions at the desired rates and measure the corresponding response times. Load generators could be configured to generate requests constant times apart to mimic transaction generation at a set rate, or to generate arrival streams at pseudorandom times as in a discrete event simulation.

The load scripts can reflect the complexity of the actual transactions supported by the SUT. For instance, if the SUT were an on-line banking system, a simple script might generate login and logout commands, while a more complex script might generate a login followed by a series of balance queries or transfer requests followed by a logout. The scripts would be run for a prolonged period to allow average values of performance measures and resource usage to be obtained. Several parallel sessions could be generated by multiple virtual users running on one or more workstations simultaneously. Each load generator itself might take time to reach equilibrium. Since equilibrium within the load generators is a precondition for the generated load to be constant and hence for the whole system to be in equilibrium, performance data should be collected from them to determine whether and when equilibrium is reached.

Overview

When a system is in equilibrium under constant load, the vector of measurements will vary within very small range. In typical load tests, the performance measures of a well behaved system start at either a high or low level, and then usually vary very little from the average until the load is turned off.

Large deviations from the average occurring after the warm-up period may have a variety of causes. Examples of these include (a) events such garbage collections, (b) the exhaustion of resource pools such as thread pools and sliding windows, (c) inactivity following the exhaustion of the pools followed by timeouts and the subsequent resumption of activity enabled by the forced replenishment of the pools, and (d) thrown exceptions and system crashes.

Ideally, load tests are conducted under tightly controlled conditions in which the causes of perturbations are known or readily identified. A method according to an embodiment of the invention sorts the observations of each performance measure in ascending order, and identifies the plateau corresponding to the region in which the gradient of each resulting curve is closest to zero, e.g., less than some chosen value $\epsilon$. By construction, zero is the minimum possible gradient, because sorting the values assures that the function of the sequence number is non-decreasing. For suitably long tests in which the system has reached equilibrium, the set of data values near the average value will lie on a nearly horizontal plateau whose height at the left hand end is within some small value of its height at the right hand end. If the sorted sequence contains only very small jumps, the cue will have a point of inflection along the plateau. Thus, one can automatically verify the approximate boundaries of the plateau by looking for regions on the sorted curve in which the first and second order differences of the function with respect to the sequence number are both close to zero, and for which the difference in the values between the left and right hand ends is small. The differences can be used as surrogates for the first and second derivatives, which cannot exist because the independent variable (sequence number) is discrete rather than continuous.

One result of sorting observations is to push outliers near the ends of the curve. This has no adverse impact on the analysis provided (a) that one knows the source of the disturbances that caused them and (b) that the system is otherwise well behaved. Note that each observation to be sorted corresponds to an average over its respective time interval. The recorded values of utilizations, queue lengths, page pool sizes, and other time-averaged quantities are averages over the corresponding intervals. The recorded values of response times and other sampled statistics are the averages of individual samples collected in each interval. These quantities may be the respective outputs of commercial measurement tools, as well as of the standard system measurement utilities that usually accompany an operating system such as Windows XP™, Unix™, or Linux.

To verify that the system is truly in equilibrium, it needs to be established that sorted sequences of all of the performance measures of interest, including those of the load generators, have equilibrium periods in common. This is because the average values of performance measures may lag one another, or because the effects of disturbances in one part of the system may not be reflected in all performance measures at once. For example, a transient disturbance may affect the observed resource utilizations immediately, but may not show up in measured response times until the affected jobs have been completed.

To establish the relationships between several performance measures, their averages are examined over intervals in which they are simultaneously in plateaus. To do this, one first identifies the "plateau sets" for each performance measure, sorts the points in each plateau set by the times at which they were collected, and then identifies the subsets of the plateau sets that occur within approximately the same time intervals.

A flowchart of an algorithm according to an embodiment of the invention is shown in FIG. 1. The inputs are M sets of observed performance measures consisting of records with fields (timestamp, value). The sets should all be collected over the same time period and have the same cardinality. The outputs are sets of overlapping intervals and the corresponding averages of the performance measures. Referring now to the figure, for each performance measure, one sorts the observed measures by value, in ascending order, at step 11, and at step 12, identifying the plateau regions by looking for the sets of data points according to the following criteria. (1) The estimates of the first and second derivatives for any point in the sorted set are both close to zero in absolute value. (2) There is an unbroken sorted sequence of points satisfying criterion (1). This constitutes the plateau. (3) The difference between the smallest and largest values of a given performance measure in the plateau is small. At step 13, the values are sorted within the plateau region by time stamp in ascending order. Steps 11, 12, and 13 are looped from step 14 for each performance measure.

At step 15, the overlapping time intervals covered by the plateaus for sets of performance measures are identified. Finally, at step 16, the averages of the performance measures over the overlapping intervals are computed.

Identifying the Plateau for Each Performance Measure

Although the independent variable of the sorted curves is discrete, it is useful to use formulae for estimating the first and second derivatives of continuous differentiable functions to identify the plateaus. Because the independent variable, the sequence number, is discrete, adjacent points along the x axis cannot be made arbitrarily close, as is usually assumed when using numerical techniques for estimating derivatives. Formally, one cannot let $x_{N+1}$ tend to $x_n$ to obtain an estimate of $f'(x_n)$ from the ratio $(f(x_{n+1})-f(x_n))/(x_{n+1}-x_n)$. This is not a severe problem for this purpose, as computational accuracy sufficient for curve fitting or interpolation is not required. Indeed, experience shows that anomalies caused by the inability to make successive x values arbitrarily close are good indicators that the $n+1^{th}$ point should not be included in the plateau. According to an embodiment of the invention, conventional approximations to the derivatives are accurate enough to identify a valid set of values of equilibrium performance measures.

Three classical formulae for estimating the slope of the sorted data were considered. Since the data are sorted, the slope can never be zero unless successive measured values are equal. Because the x values are the natural numbers, one cannot make the difference between them arbitrarily small. Therefore, some estimates of the slope may be negative, which is anomalous for increasing sequences.

The estimates of the first derivative are as follows:

(1) The first difference estimator will always be non-negative, because the performance measures are arranged in ascending order. Since successive x values are always one apart, this formula is not always accurate. Nevertheless, it is a useful indicator of the magnitude of the slope. The estimator is $$\hat{f}'(x_{n+1}) = f(x_{n+1}) - f(x_n), \tag{1}$$

because $x_{n+1} - x_n \equiv 1$.

(2) The second difference estimator is $$\hat{f}'(x_n) = \frac{1}{2}(f(x_{n+1}) - f(x_{n-1})), \tag{2}$$

again because $x_{n+1} - x_n \equiv 1$. This difference will also always be non-negative, by construction. It smoothes jumps, which is not always desirable according to an embodiment of the invention.

(3) The five-point repeated Richardson formula, which is given by:

$$\hat{f}'(x_n) = \frac{1}{12}[f(x_{n-2}) - 8f(x_{n-1}) + 8f(x_{n+1}) - f(x_{n+2})], n \geq 2. \tag{3}$$

It is easy to see that this expression can become negative if $f(x_{n+2})$ is large enough, or if $f(x_{n-1})$ is large enough. This is an anomaly, since the sequence of function values is sorted in ascending order. According to an embodiment of the invention, it has usually been $f(x_{n+2})$ that is too large. If that is the case and if the first difference at $x_{n+2}$ is too large, the $(n+2)^{th}$ point is outside the plateau and will not be included for the purpose of computing average values.

According to an embodiment of the invention, it has been found that negative values of the Richardson estimates occur at jumps (discontinuities) or where the estimated value of the first derivative either increases or decreases sharply, or where the estimates of the second derivative would change sharply. Continuity at a point is a necessary condition for differentiability there. The anomaly can be attributed to the possible presence of a discontinuity in the values of the sorted sequence. This is an estimation method according to an embodiment of the invention, because jumps and the negative values of the estimates of the derivative correspond to the endpoints of the plateau and predict its endpoints in a manner consistent with intuition, especially when used in combination with an estimate of the second derivative that shows an increased deviation from zero.

The second derivative can be estimated using the expression:

$$\hat{f}''(x_n) = \frac{1}{h^2}[f(x_{n-1}) - 2f(x_n) + f(x_{n+1})] \tag{4}$$

where h is the constant difference between $x_n$ and $x_{n+1}$. The estimate is readily obtained from first principles. As before, h=1. Experimentation shows this estimator to be sufficiently accurate for the purpose of identifying the neighborhood of an inflection point in the plateau. Notice that this need not be the same as an inflection point in the sorted sequence $\{f(x_n)\}$, since successive values in the sequence could be equal. The reason for considering a neighborhood rather than a precise inflection point is that it possible to construct a pathological sequence consistent with the definition of a plateau in which the second difference estimator alternates in sign.

To define when values are close together or close to zero, first note that in real analysis, a function $f$ is defined to be continuous at a if, given $\epsilon>0$, there is a number $\delta>0$ such that $|f(x)-f(a)|<\epsilon$ whenever $|x-a|<\delta$, and both $\delta$ and $\epsilon$ are as small as one pleases. The performance measures of interest according to an embodiment of the invention occur on different scales and are expressed in different sets of units. For instance, transaction response times are expressed in seconds or fractions of a second, while utilizations expressed as percentages varying from 0 to 100. This means that different values of $\epsilon$ should be chosen for different performance measures. According to an embodiment of the invention, it has been found that setting $\epsilon$ to 0.15% of the current value of $f$ is effective. Since x represents a sequence number, $\delta$ cannot be as small as one pleases. $\delta$ is physically constrained by $1 \leq \delta < 2$.

The measurement value at the leftmost point in the plateau must simultaneously satisfy $$|\hat{f}'(x_0)|<\epsilon_1, |\hat{f}''(x_0)|<\epsilon_2. \quad (5)$$

For n>0, the $(n+1)^{th}$ measurement value is included if it simultaneously satisfies $$|\hat{f}'(x_{n+1})|<\epsilon_1, |\hat{f}''(x_{n+1})|<\epsilon_2, \quad (6)$$

and $$|f(x_{n+1})-f(x_n)|<\epsilon_3, \quad (7)$$

for suitably chosen $\epsilon_i>0$, i=1, 2, 3. If the Richardson estimate of $f'(x_{n+1})$ is negative, the $n+1^{th}$ point is excluded from the plateau.

Identifying the Time Intervals Covered by the Plateaus of Different Performance Measures The following are among the reasons why the choice of data for inclusion in averages must be done with care.

1. One may need to account for the possibility that the clocks at different data sources might not very tightly synchronized, or that the intervals of data collection at different sources may not be exactly coincident. For example, the clocks on the hosts under test might not be set to the same time as a network sniffer. However, according to an embodiment of the invention, it is assumed that all observations are gathered at a central collection point that places its own timestamps on them. In addition, according to an embodiment of the invention, it is assumed that the clocks of all hosts involved in the test, including that of the central data collector, are synchronized with a common time server, and that the observation intervals for all performance measures are coincident. This simplifying assumption is reasonable in a controlled environment in which the system under test, load generators, and central data collector are located within the same building, and are perhaps interconnected by an isolated local area network.

2. When identifying the observations that will be used to compute the average values of the performance measures, one must allow for the possibility that different performance measures will achieve their equilibrium values at different times. To see this, observe that as the test ramps up, it is possible that a backlog of transactions could occur that takes time to clear, or, alternatively, that it will take time for a backlog to accumulate in the neighborhood of the average queue length and average response time, while resource utilizations close to the average under a given constant load might be achieved in a shorter amount of time.

By definition, resource utilizations, such as CPU busy, I/O busy, and mean queue length, are average values over designated time intervals. In the simulation literature, these are sometimes referred to as time persistent variables. Response times can be collected and analyzed individually or displayed as averages taken over the same time intervals as the time persistent measures. According to an embodiment of the invention, averages of response times are collected during successive time intervals because this smooths out fluctuations without necessarily obscuring trends, and because storing averages is less expensive than storing many individual observations.

A set of criteria according to an embodiment of the invention for including observations in the computation of averages in the plateau interval is as follows:

1. The observations of all performance measures must be present for each interval included in the equilibrium set, because there are functional relationships between them. If an observation for an interval is missing for one performance measure, the corresponding observations for the other performance measures should be discarded.

2. The largest set for which all observations are present and sufficiently close together is the set over which averages for the performance measures will be computed.

3. Chronologically successive observations within the plateau sets of the different performance measures are deemed to be sufficiently close together if they are no more than $k\delta$ apart, where k is a small positive integer (e.g., 4) and $\delta$ is the length of observation intervals.

Statistical Rationale for Automated Equilibrium Interval Identification

By definition, when a system approaches equilibrium, the rates of change with respect to time of the probabilities of being in each system state approach zero. If the system is not in equilibrium, the performance measures derived from these state probabilities will vary noticeably over time. Similarly, the system cannot achieve equilibrium for measurement purposes if the load and system parameters (such as average arrival rate and average service time) are not kept constant. During warm-up, ramp-down, and disturbances, the observations may be regarded as being drawn from different parent populations with different distributions from those of the system in equilibrium.

The observations taken from the time interval in which the system under test is in equilibrium are drawn from the same parent population. This is the population of interest for the purpose of assessing average performance under a constant load. The other points are not of interest and will be excluded from the computation of the averages. The performance measures of a system under constant load should vary little while the system is in equilibrium.

If the system reaches equilibrium when subjected to a constant offered load, for sufficiently long test runs, the number of observations taken while the system is in equilibrium will be larger than the number taken during the ramp-up and cool-down periods. The values of the observations will be closer together in equilibrium as well. According to an embodiment of the invention, extreme observations are excluded from the sample they are not considered to be drawn from the same parent population as those in the equilibrium interval.

Consider now the relationship between the sorted sequence, the plateau(s), and the distributions of the observations outside and inside the equilibrium intervals. The sorted sequence can be denoted by the function $G(i)=x_{(i)}$, where $x_{(i)}$ denotes the $i^{th}$ order statistic for $i=1, 2, 3, \ldots, n$ in a sample of size n. The ogive or cumulative relative frequency (sometimes called the empirical distribution function), an estimate of the cumulative distribution function (CDF) of the observations over the entire measurement period, is given by $$\hat{F}(x_{(i)}) = \frac{i}{n}, \text{ for } i = 1, 2, \ldots, n.$$

Combining these 2 points, $G(n\hat{F}(x_{(i)}))=x_{(i)}$ for $i=1, 2, \ldots, n$. This means that, provided $x_{(i)} \neq x_{(j)}$ for $i \neq j$, there is a one-to-one correspondence between the points on the sorted curve and the points on the ogive. If both G and $\hat{F}$ were continuous, they would have points of inflection corresponding to the same values of i. Thus, a plateau within the sorted sequence of observations corresponds to a point of inflection of the percentage plot $\hat{F}$. At a point of inflection in the CDF, its second derivative is zero. That is, the first derivative of the corresponding PDF is zero. This means that finding a point of inflection within a plateau of the sorted sequence corresponds to finding a mode of the PDF of the parent population.

An algorithm according to an embodiment of the invention computes and checks differences between values of G for neighboring values of $i=1, 2, \ldots, n$ to locate points of inflection and samples. When successive observations in the sorted curve are close together, looking at the plateau is numerically more stable than looking at estimates of the first derivative of $\hat{F}$, which would involve dividing by the differences between them. For example, the first difference estimates of the derivative of $\hat{F}$ would be given by $$\frac{\frac{i+1}{n} - \frac{i}{n}}{x_{(i+1)} - x_{(i)}} = \frac{1}{n(x_{(i+1)} - x_{(i)})}, \quad i = 1, 2, \ldots n-1. \quad (8)$$

Determining the average value of the observations near the point of inflection corresponds to identifying the mode of the PDF within the parent population when the system is in equilibrium. Of course, this assumes that a mode exists in the first place, that it is unique, and that it is close to the mean, provided that the mean exists. A unique mode is only equal to the mean if the PDF is symmetric about it. This should not be a limitation in samples with small variances. According to an embodiment of the invention, since function values within the plateau were included because of their proximity, the variance among them is small by construction.

Characteristics of the Sorted Data

Case 1: Plateau Unique, Equilibrium Attained

If a performance test at constant load is run for a sufficiently long time and the system is stable, the value-sorted sequence of performance measures should have a long stretch in which the values are close together. If there is a large number of spikes, their causes should be investigated.

Case 2: Multiple Plateaus

Each plateau may correspond to a distinct operating region in which the system spends noteworthy amounts of time. This is a sign that the system may have spent considerable amounts of time in one operating range or the other. The original, unsorted test data should be examined to find an explanation. For two plateaus, possible explanations include:

1. The system was exhibiting periodic behavior, oscillating between two operating regions at regular intervals.
2. The system was oscillating irregularly between two operating regions.

3. The system had two distinct long periods of equilibrium behavior. This indicates that something changed in the system between the two periods of equilibrium.

This list is exemplary and non-limiting, and is based on experience. There may be other reasons for the phenomenon as well.

Case 3: No Apparent Plateau

If there is no apparent plateau with values close together, it is quite likely that the system never achieved equilibrium at all. Further investigation is required. If the sequence sorted by values has a long stretch in which the associated time stamps are consecutive, the possibility of a memory leak or algorithmic flaw should be investigated.

Periodic Traffic Causing Periodic Performance Measures

By definition, a Markov chain cannot achieve equilibrium if it is periodic. Similarly, a measured system will not achieve long term equilibrium if it is subjected to a periodic load. This does not prevent the system from being stable. On the contrary, provided that the system is not saturated at the peak of a periodic offered load, if the performance measures show the same periodicity as the offered load, the system is stable. The sorted curves will show multiple plateaus whose lengths correspond roughly to the number of complete periods observed during the test run. The ogives of the performance measures over the test run will have points of inflection corresponding to the plateaus. Scatter plots of utilizations vs. offered load will exhibit linear relationships if the system is stable. Similarly, response time curves as functions of the load will have shallow slopes corresponding to the load troughs, and steeper slopes corresponding to the load peaks.

Since equilibrium is not achieved if the offered load is periodic, it is not appropriate to attempt to estimate equilibrium performance measures, unless there are intervals within each period during which the load is constant and equilibrium can be reached. In that case, each such interval should be analyzed separately.

One way of demonstrating that the system is well behaved is to subject it to a periodic load and verify that the peaks and troughs in the performance measures occurred at the same times as the peaks and troughs in the loads provided that the peak loads do not saturate any resources. One could then subject the time series of offered loads and the time series of performance measures to spectral analyses. If the spectra of the various series of measures are similar and other conditions for equilibrium hold, the system is quite likely to be stable.

Numerical Illustrations

In the following examples, observations have been gathered in a central data collection controller. Transactions were generated at fixed intervals of time by scripts running on four load injectors with synchronized clocks. The observation intervals were of constant length $\delta=4$ seconds. Typically, experiments were run for about 3 minutes. In actual practice, however, longer test runs (e.g. 10-15 minutes) and observation intervals of length $\delta=15$ seconds are recommended, depending on the offered transaction rate.

Plateau Unique, Equilibrium Attained

This example considers a transaction system running at a nominal rate of 250 transactions per second per load injector. The following measures are considered here for illustration:

1. The offered transaction rate as measured on the load generator. Only data collected while the actual value itself is in equilibrium should be included in the average values of the performance measures.
2. The average CPU utilization of the server.
3. The average response time of the server.

Figure 2:
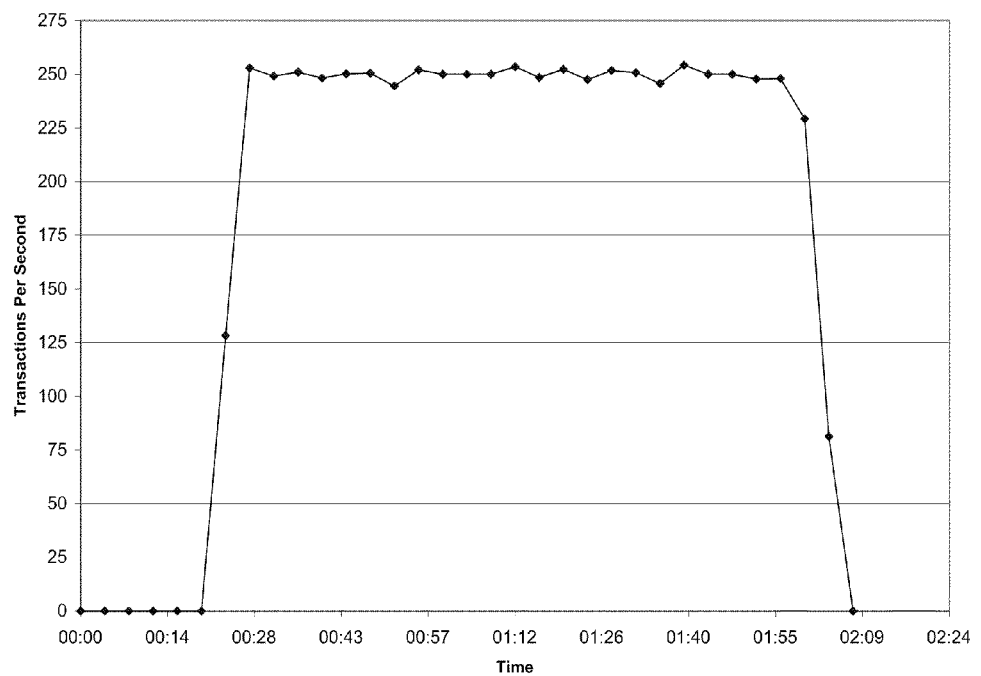
FIG. 2 is a graph of the offered transaction rate vs. time for one load generator, according to an embodiment of the invention.
Figure 3:
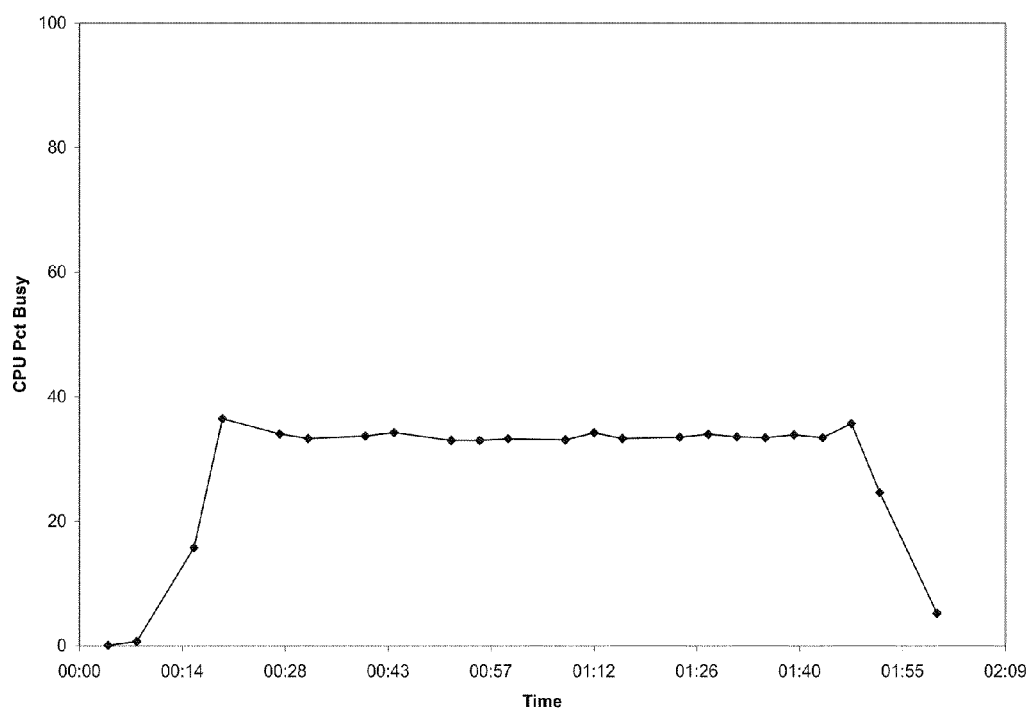
FIG. 3 is a graph of the CPU utilization vs. time, according to an embodiment of the invention.
Figure 4:
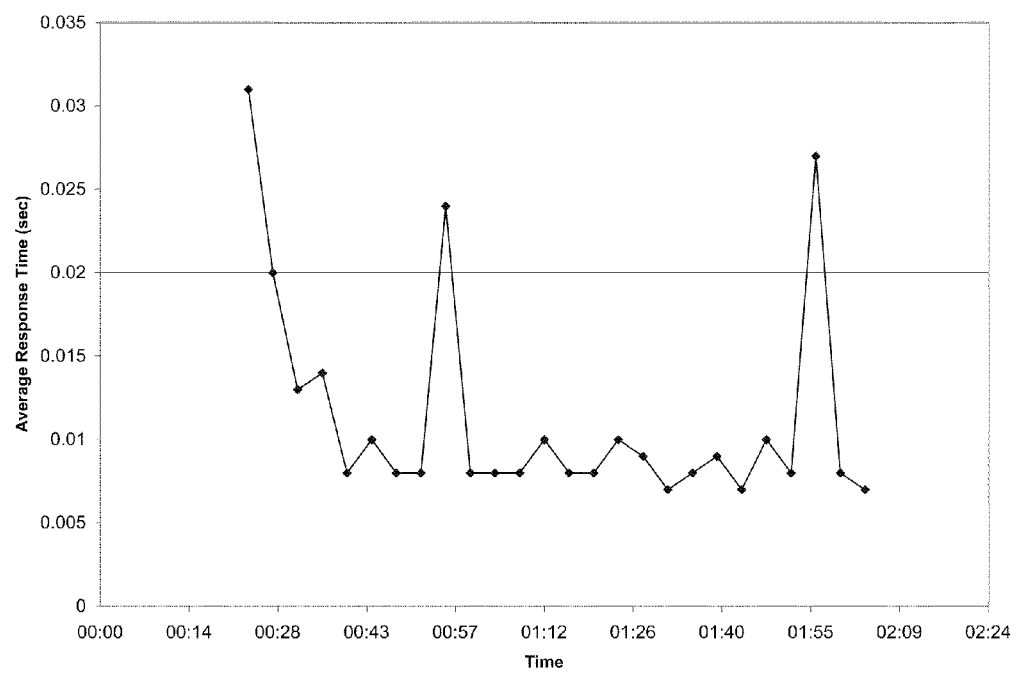
FIG. 4 is a graph of the average response time vs. time, according to an embodiment of the invention.

FIGS. 2-4 show the evolution of these measures during the test run. To save space, only the actual throughput rates and average response times for one load injector are shown here. Others behaved similarly. The transaction rate, shown in FIG. 2, and the CPU utilization, shown in FIG. 3, climb steeply to their respective equilibrium values and then settle down. As expected from the Utilization Law, these two curves have about the same shape. The average response time, shown in FIG. 4, exhibits spikes before and after settling down to its equilibrium value. This use case is well behaved at this load level.

Figure 5:
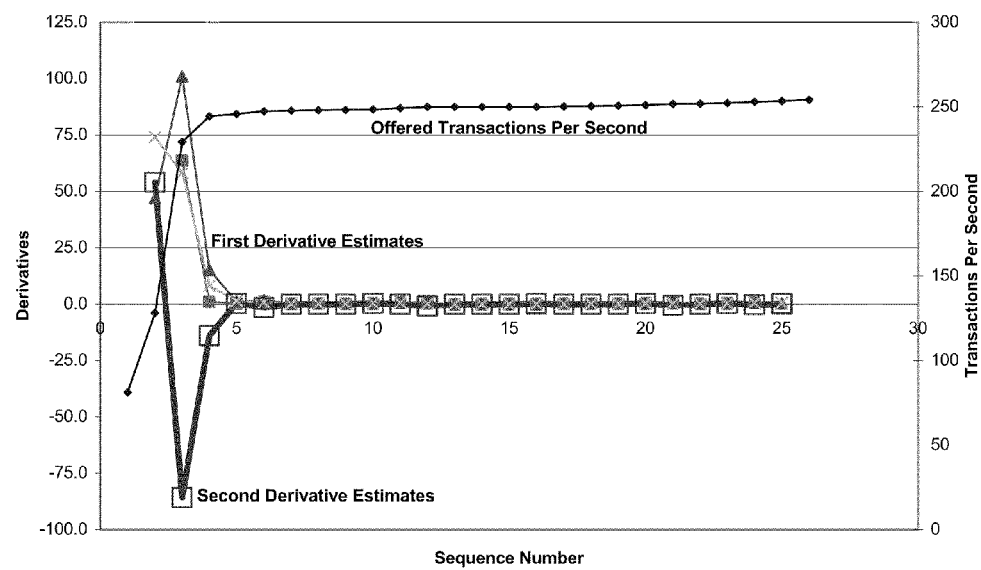
FIG. 5 is a graph of the estimates of the first and second derivatives of the sorted offered transaction rate curve, according to an embodiment of the invention.

FIG. 5 shows the sorted offered transaction rate data and estimates of the corresponding first and second derivatives. The right hand y axis shows the offered transaction rate. The left handy axis lists the values of the estimates of the first and second derivatives of the sorted curve. The sorted curve rises steeply from an initial value of about 75 transactions per second and levels off near the target value of 250 transactions per second. The estimates of the first and second derivatives vary accordingly. All estimates of the derivatives eventually settle down to values between 0.0 and 0.75, which is less than 1% of the equilibrium value of the performance measure.

Figure 6:
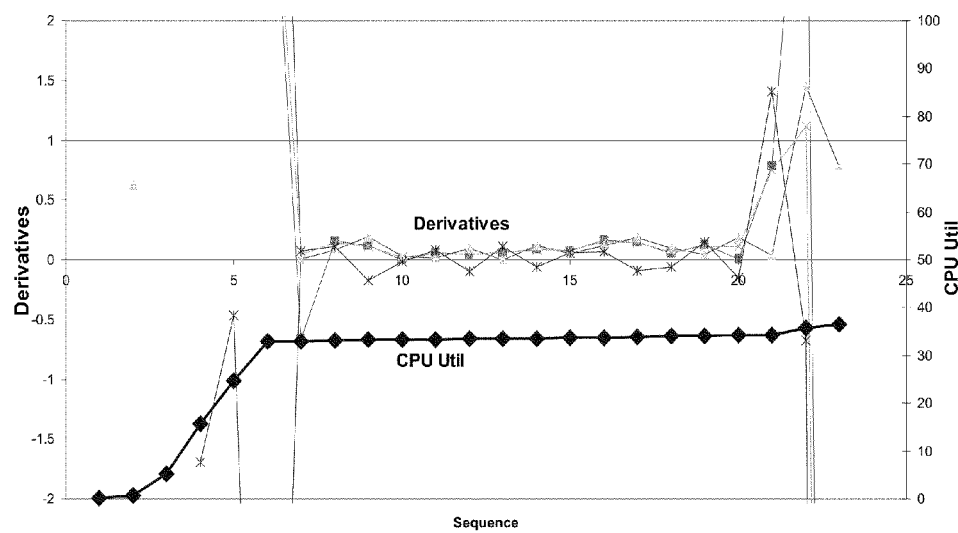
FIG. 6 is a graph of the sorted CPU utilizations and the corresponding derivative estimates, according to an embodiment of the invention.

FIG. 6 shows the sorted CPU utilizations and estimates of the corresponding derivatives. The right hand axis shows the CPU utilization. The left hand axis shows the values of the estimates of the first and second derivatives of the sorted curve. The sorted curve rises steeply from an initial value of zero and levels off near 35%. The estimates of the first and second derivatives vary accordingly. All estimates of the derivatives eventually settle down to values between 0.0 and 0.05, which is less than 1.5% of the equilibrium value. The sudden jumps correspond to the CPU utilizations that appear as peaky shoulders at the left and right hand ends of FIG. 3. The candidate equilibrium interval includes points 8-19.

Figure 7:
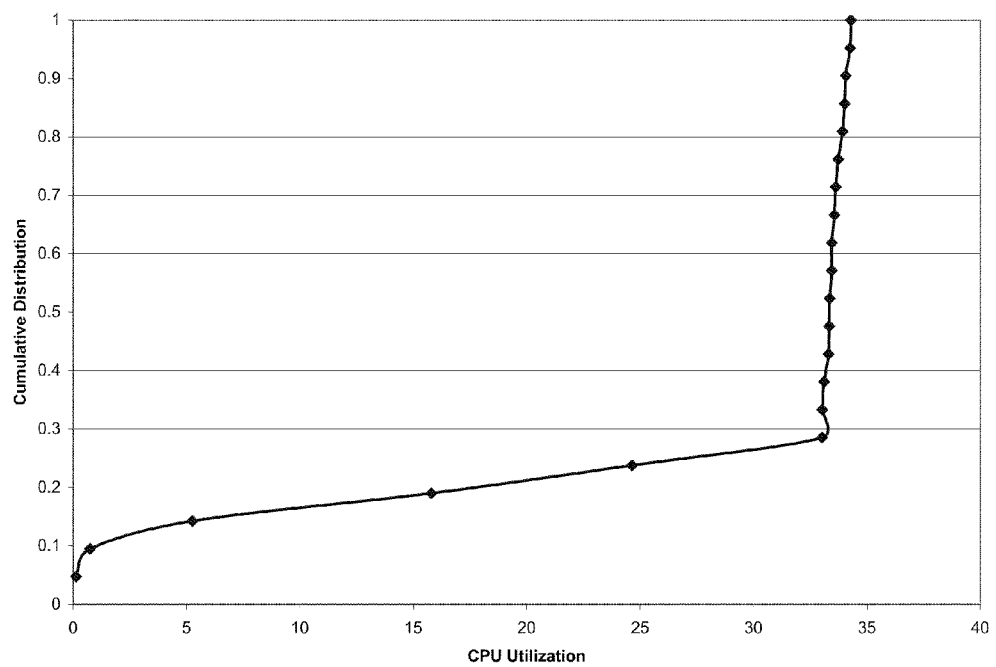
FIG. 7 is a graph of the cumulative plot of the CPU utilization, according to an embodiment of the invention.
Figure 8:
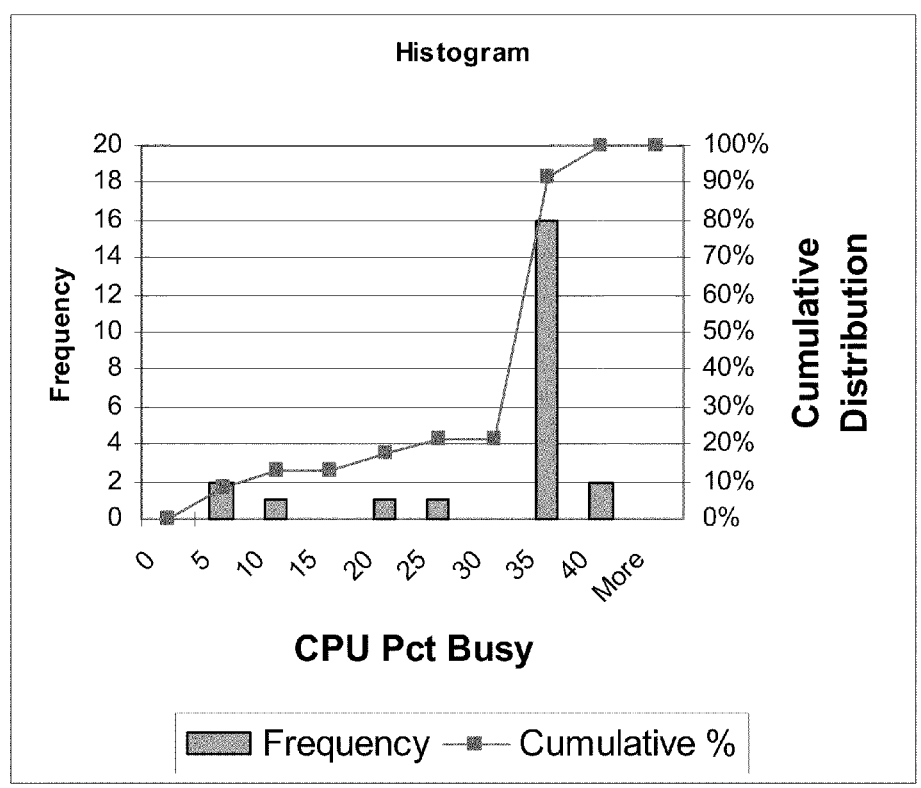
FIG. 8 is a graph of the histogram and corresponding cumulative plot for CPU PCT Busy, according to an embodiment of the invention.

FIG. 7 is a cumulative plot of the CPU utilization, and shows that the fraction of observations less than or equal to the current one, that is, $Pr(X<x_i) \approx i/n$ for $i=1, 2, \ldots, n$. The portion with the steep slope in the neighborhood of a CPU utilization of about 33% corresponds to the plateau in FIG. 6. FIG. 8 shows the histogram and a graph of the corresponding cumulative plot for the CPU Pct Busy. Estimating the derivative of the estimate of the cumulative distribution function is hazardous because the close proximity of the ordinate values makes the slope of the CDF almost infinite. Since the CDF has a point of inflection in this neighborhood, the PDF has a maximum there corresponding to the mode of the sample, as shown in the histogram plot in FIG. 8.

Figure 9:
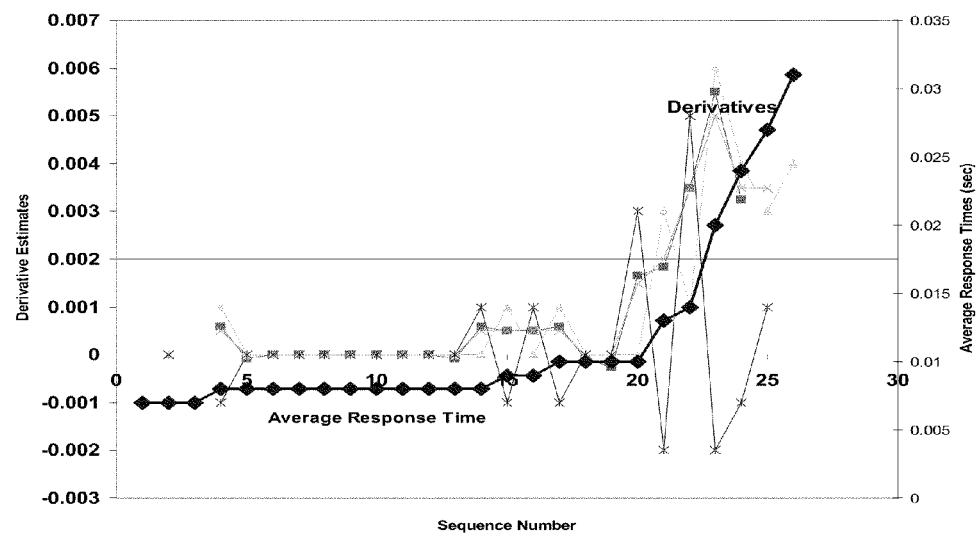
FIG. 9 is a graph of the sorted average response times and the corresponding derivatives, according to an embodiment of the invention.

FIG. 9 shows the sorted average response times and their corresponding derivative estimates. The response times range from about 0.007 seconds to 0.033 seconds. The values of the first differences and of the estimates of the second derivative hug the x axis for points 5-13. The higher-order difference estimates for the first derivative rise at that point, corresponding to a large percentage increase in the value of the sorted curve. The estimate of the second derivative begins to oscillate, because the rate of increase in the sorted curve is irregular. The candidate equilibrium set includes points 7-13.

The intersection of the candidate equilibrium sets is points 8-13. The next step is to check that the corresponding points in each graph were sampled during the same time intervals. The averages of the performance measures will be computed accordingly.

Figure 10:
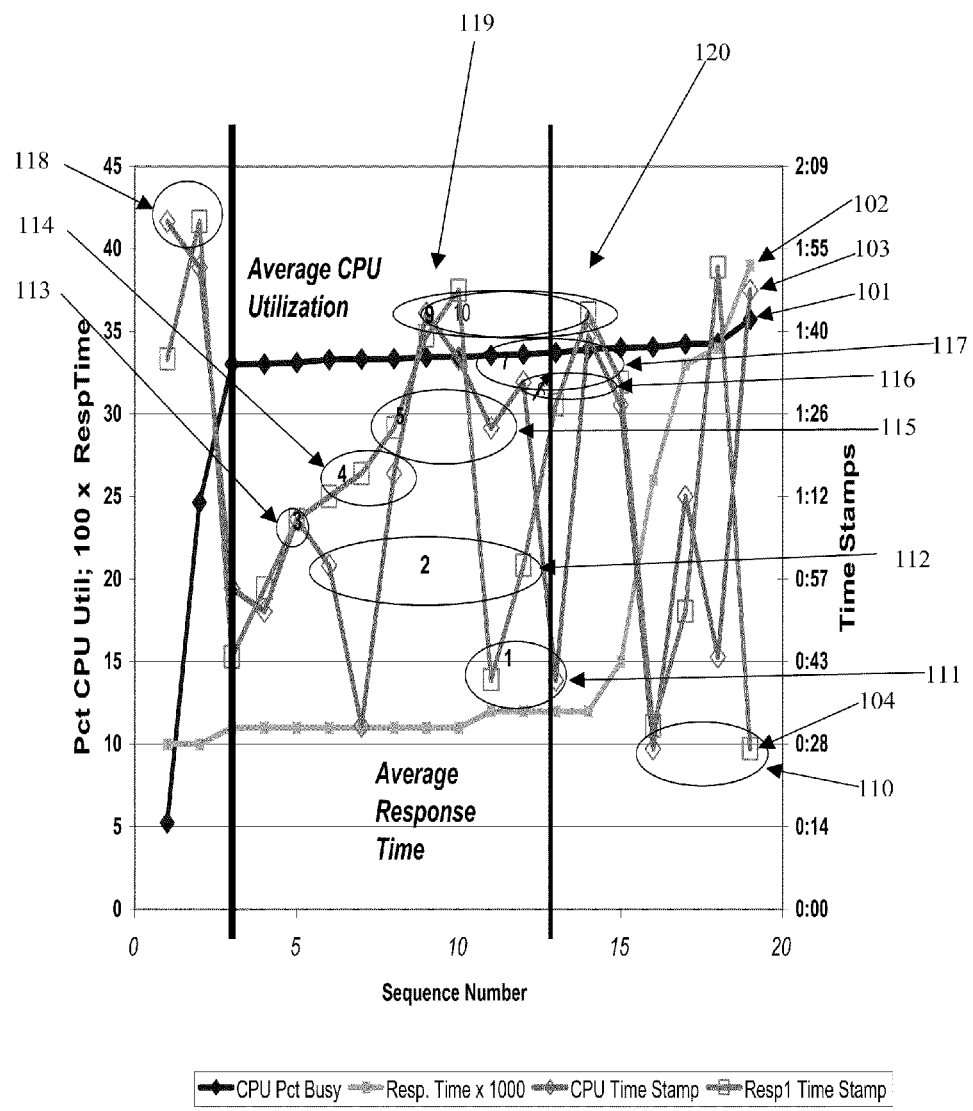
FIG. 10 is a graph of the sorted performance observations and corresponding timestamps, according to an embodiment of the invention.

FIG. 10 shows the sorted performance measures (solid point markings) plotted with respect to the left y axis and their corresponding time stamps (hollow point markings) plotted with respect to the right y axis. The performance measures are the CPU Pct Busy 101, it corresponding time stamp 103, the average response time (in msecs.) 102, and its corresponding time stamp 104. Formally, for the $m^{th}$ performance measure, if the $n^{th}$ smallest value is $v_{m,n}$ and the corresponding time stamp is $t_{m,n}$, two graphs are plotted:

(1) the sorted graph of values of the performance measures, $\{(n, v_{m,n})\}$; and (2) the graph of the corresponding timestamps, $\{(n, t_{m,n})\}$, plotted in the same horizontal order as the $v_{m,n}$'s.

The solid black vertical lines correspond to the boundaries of the plateaus, where the derivatives are close to zero as shown in FIGS. 6 and 9. The sequence numbers on the x axis corresponds to the sets of time intervals for which the set of observations of all performance measures is complete. The figure also displays a plurality of horizontal ovals 110, 111, 112, 113, 114, 115, 116, 117, 118, 119, 120, 121. Each horizontal oval encloses pairs of points at the same level on the time stamp lines for the average CPU utilization and the average response time. The points with the same timestamp values correspond to the performance measures from different series with the same timestamp, i.e. with $t_{m,n} = t_{j,k}$ and $m \neq j$. The numbers 1, 2, 3, 4, 5, 6, 7, 9, 10 in the ovals 111, 112, 113, 114, 115, 116, 117, 119, 120, respectively, around pairs of time stamps indicate the time ordering of the corresponding observations in each plateau of performance measures. Notice that the time stamps of different performance measures with the same positions in the sorted sequences of performance observations need not be the same, as in the oval marked 2, but they could be, as in the oval marked 3. While one would expect strictly monotone relationships between the long-term average values of performance measures, there is also some random deviation from the relationships in practice, which is the case here. In the example in FIG. 10, the observations of the performance measures at pair number 1 can only be grouped with those for pair number 2 if k is greater than or equal to 4. If the observations corresponding to the timestamps in ovals 2-5 are included, an average CPU busy of 33% is obtained, along with an average response time of 11.5 msec, and 249 actual transactions per second (target 250 transactions per second). These values are close to what would have been chosen visually. The observations corresponding to timestamps 6-10 have been excluded because either one or the other observations of a performance measure lies outside the overlapping plateau regions indicated by the solid black vertical lines.

Multiple Plateaus in One Performance Measure None in Another

Figure 11:
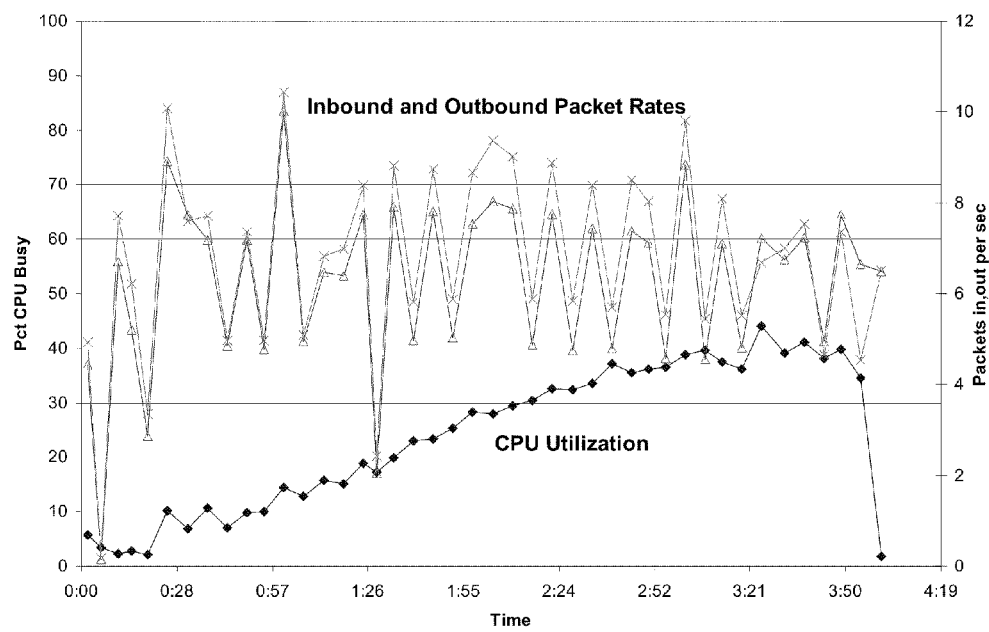
FIG. 11 is a graph of the ascending CPU utilization over time, oscillation of inbound and outbound packet rates, according to an embodiment of the invention.
Figure 12:
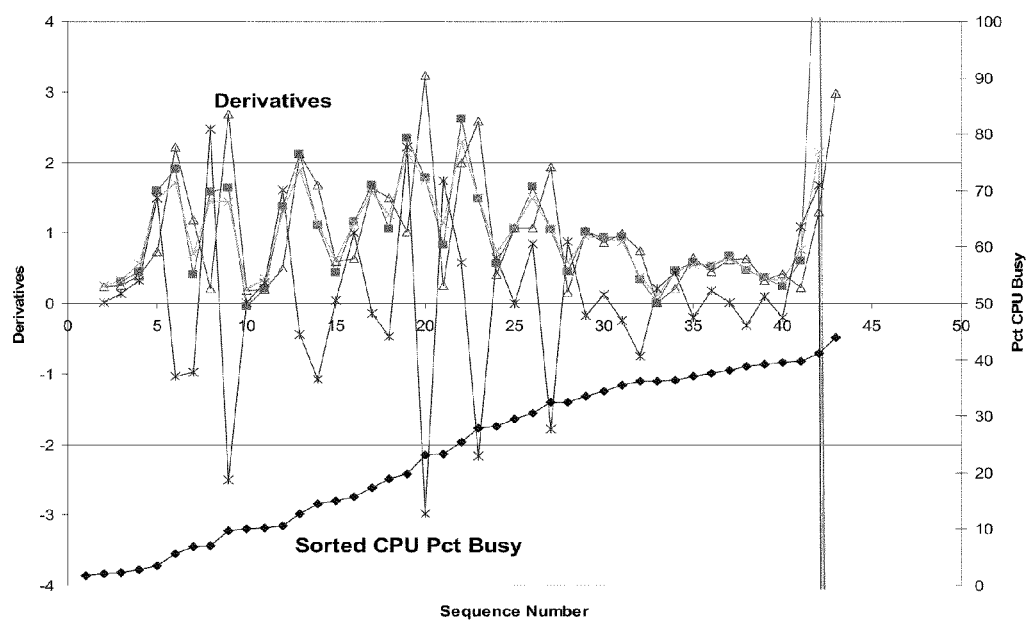
FIG. 12 is a graph of the sorted CPU utilizations. Note the absence of a plateau and the oscillating derivatives, according to an embodiment of the invention.
Figure 13:
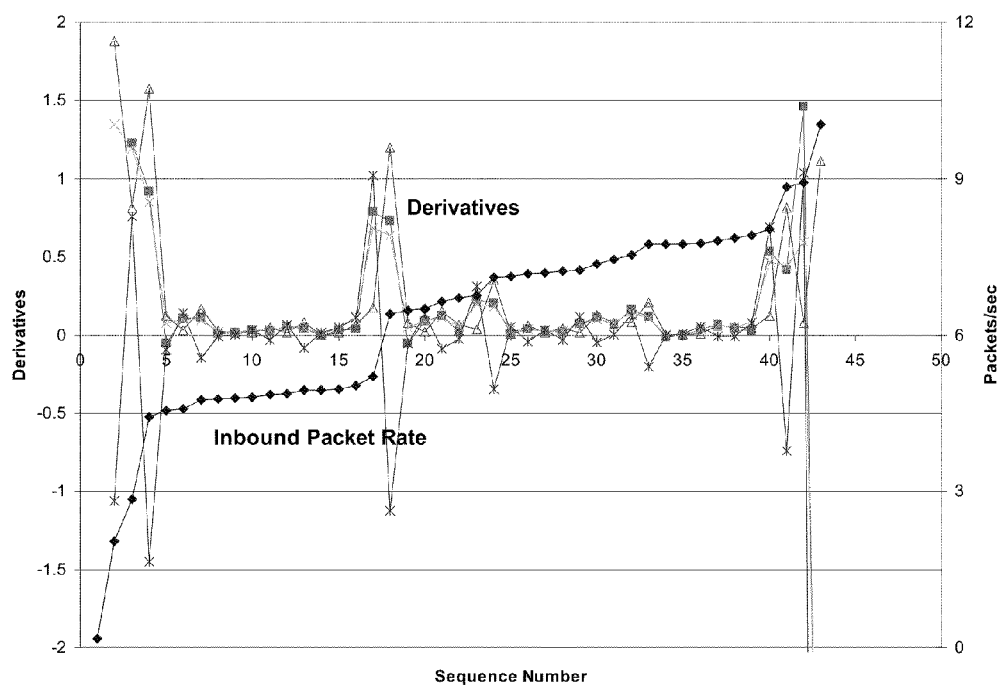
FIG. 13 is a graph of the inbound packet rates in ascending order, according to an embodiment of the invention.

This example concerns a use case in which the SUT is subjected to insertion transactions of the same type, allegedly at a constant rate during the entire test period. FIG. 11 shows the CPU utilization over time along with the inbound and outbound packet rates. From FIG. 11 it is seen that the CPU utilization increases with time, while the inbound packet rate oscillates among two or three values that are quite close together. The sorted plot of the CPU utilizations in FIG. 12 has no plateau, and oscillating derivatives with no zero-valued estimates. The average inbound packet rate is approximately proportional to the transaction rate. FIG. 13 is a graph of the inbound packet rates in ascending order. The sorted plot of inbound packet rates in FIG. 13 has multiple plateaus corresponding to the extreme values of the oscillations, and correspondingly varying derivatives. Notice that the estimate of the second derivative in FIG. 13 touches or crosses the x-axis in numerous places, corresponding to points of inflection on the plateaus of the sorted curve. It can be concluded from these curves that the use case suffers from a bug in which the insertion processing time is monotone increasing with respect the number of previously inserted records. This is an undesirable system characteristic. The system can never reach steady state as long as this use case is active at this load. Hence, there is no equilibrium interval.

Figure 14:
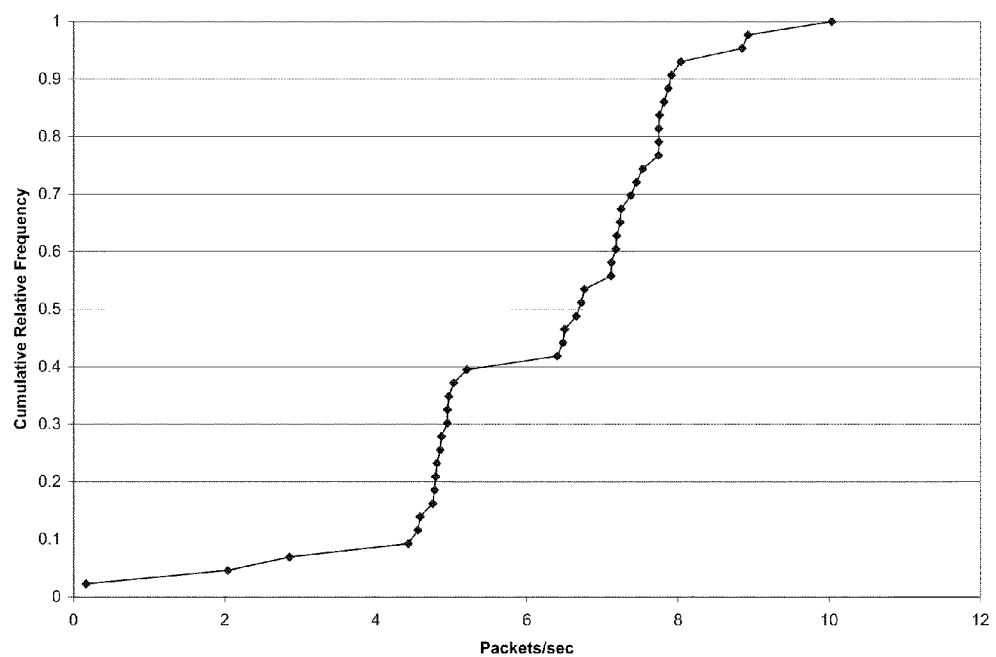
FIG. 14 is a graph of the cumulative relative frequency of inbound packet rates, according to an embodiment of the invention.

FIG. 14 shows the cumulative relative frequency of the inbound packet rates. There are distinct segments of the curve in which the slope is nearly constant, corresponding to the plateaus in FIG. 13. If there were a single long plateau, the cumulative relative frequency would only have one region with nearly constant slope, like that in FIG. 7.

Time Stamp Tree

To automate the process illustrated in FIG. 10, a tree ordered by time stamps at intervals corresponding to those at which the performance measures were collected is constructed, with nodes containing time stamps within the equilibrium intervals at the leaf nodes. According to an embodiment of the invention, any balanced tree structure with the sought information at the leaves, such as a B-tree, will suffice. The idea is to find the timestamps that are close together and group them. The leaf nodes have data points from the plateaus hanging from them. Each data point in each plateau is associated with a record containing the following fields: Time Stamp, PerformanceMeasureID, Value. Each leaf contains the time stamp and a list of records with the names of performance measures whose values line on the respective plateaus and the corresponding values themselves. According to an embodiment of the invention, once all the data points have been entered in the tree, each leaf node will contain a record of the form

```
{
    TimeStamp;
    (MeasureName1, Value1),
    (MeasureName2, Value2),
    ...
    (MeasureNamek, Valuek)
}
```

Figure 15:
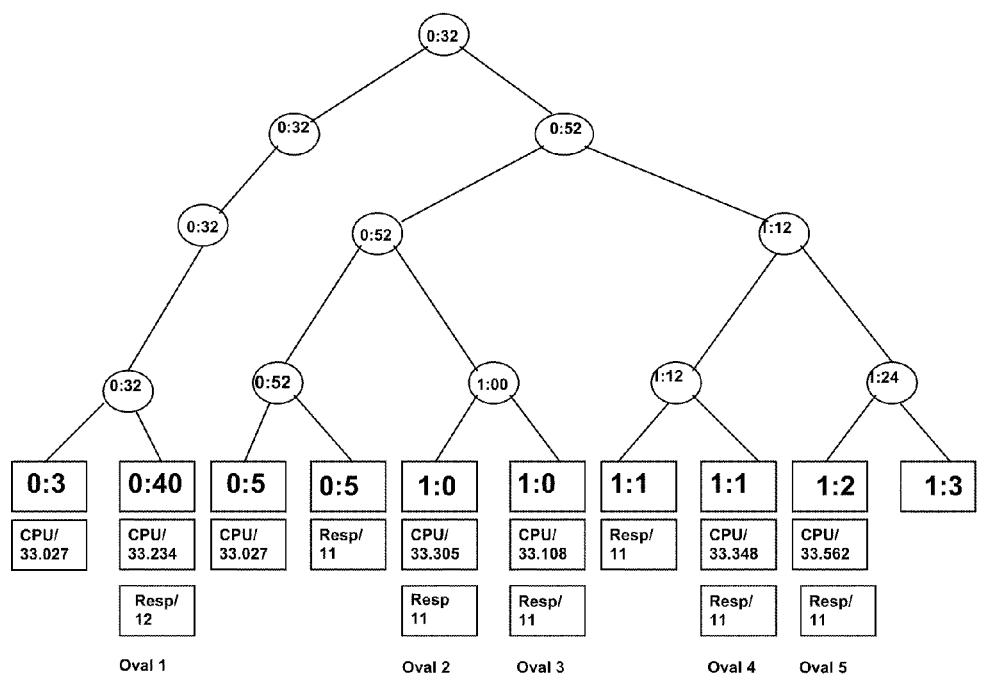
FIG. 15 is a graph of the partial time stamp tree corresponding to the data in FIG. 10, according to an embodiment of the invention.

Notice that not all the leaf records will contain values for all the performance measures. The ordering of the measures in the lists depends only on the order in which they were inserted. If the value of an observed performance measure did not lie within the plateau at that time, it will not be included in the list at the corresponding leaf. Once the equilibrium plateau data points of all performance measures have been added to the tree, the set of observations belonging to each time stamp are treated as belonging to the equilibrium interval if the associated list contains all performance measures of interest, and if the lists at the neighboring leaves also contain all performance measures of interest. Part of a time stamp tree corresponding to FIG. 10 is shown in FIG. 15. The data in the leaves marked Oval 2, Oval 3, Oval 4, and Oval 5 correspond those with the same time stamps in ovals with the same numbers in FIG. 10, and are included in the computation of the averages of the performance measures.

Automatically Comparing Load Test Data

According to another embodiment of the invention, load test data on a system before and after a modification and conducted under identical load conditions can be automatically compared. Suppose that a system is tested before and after a modification under identical load conditions, for identical amounts of time. Suppose further that n observations of a performance measure $\{x(i), i=1, 2, \ldots, n\}$ are collected during the first test run and n observations of the same performance measure $\{y(j), j=1, 2, \ldots, k\}$ for the second test run. It is not required that k=n in general. Without loss of generality, suppose further that the observations $\{x(1), x(2), x(3), \ldots, x(n)\}$ from the first test run are sorted so that $x(i-1) \leq x(i)$ for $i=2, 3, \ldots, n$, and similarly for the y's for the second test run. Define the empirical distribution function $$F(x)=i/n \text{ if } x(i) \leq x, x(i+1) > x \text{ and } i=1, 2, \ldots, n-1,$$

and $$F(x)=1 \text{ if } x \geq x(n).$$

Define G(y) similarly with respect to the y's. Under the null hypothesis that the modification has no effect on performance, the functions F and G will be statistically identical.

The Kolmogorov-Smirnov (K-S) test is used to determine if two data sets differ significantly by comparing their empirical distribution functions. This test makes no assumptions about the forms of the underlying distributions of the two samples. It is therefore very convenient for the comparison of datasets whose underlying distribution functions are not known. In particular, it is suitable for the comparison of entire series of performance measures taken during a load test or simulation run, not just the equilibrium values. This is useful, because transient behavior is indicative of the characteristics of both stable and unstable systems.

The Kolmogorov-Smirnov (K-S) test uses an empirical cumulative distribution function (ECDF): given N ordered data points $x_1, x_2, \ldots, x_N$, the ECDF is defined as $$E_N = n(i)/N$$

where n(i) is the number of points less than $x_i$ and the $x_i$ are ordered from smallest to largest value. This is a step function that increases by 1/N at the value of each ordered data point. The K-S test is based on the maximum distance between the ECDF for the sample and the specific distribution being tested.

The Kolmogorov-Smirnov test statistic is defined as $$D = \max_{1 \leq i \leq N} \left( F(x_i) - \frac{i-1}{N}, \frac{i}{N} - F(x) \right)$$

where F is the theoretical cumulative distribution of the distribution being tested which must be a continuous distribution (i.e., no discrete distributions such as the binomial or Poisson), and it must be fully specified (i.e., the location, scale, and shape parameters cannot be estimated from the data). The distribution of the K-S test statistic itself does not depend on the underlying cumulative distribution function being tested, and it is an exact test not dependent on the sample size for validity.

The hypothesis regarding the distributional form is rejected if the test statistic, D, is greater than the critical value obtained from a table. There are several variations of these tables in the literature that use somewhat different scalings for the K-S test statistic and critical regions, thus one needs to ensure that the test statistic is calculated in a way that is consistent with how the critical values were tabulated.

If two data sets are significantly different, the cause of the difference is investigated. The K-S test answers the question "Did these two samples come from a population with the same distribution?" by checking whether sup|F(x)−G(x)| is less than or equal to a point value D in published tables. If the answer is yes, then the null hypothesis holds, otherwise, it does not.

According to an embodiment of the invention, the question that is answered is "Did the system behave significantly differently in the second run from the way it did in the first run?" The differences concern not just averages, but also the time it took the performance measures to achieve their average values in each test run, as well as how the system may have responded to purposely triggered events occurring at the same times since the start of each run. This is a broader question than "Did the system perform better in one run than in the other?"

Figure 16:
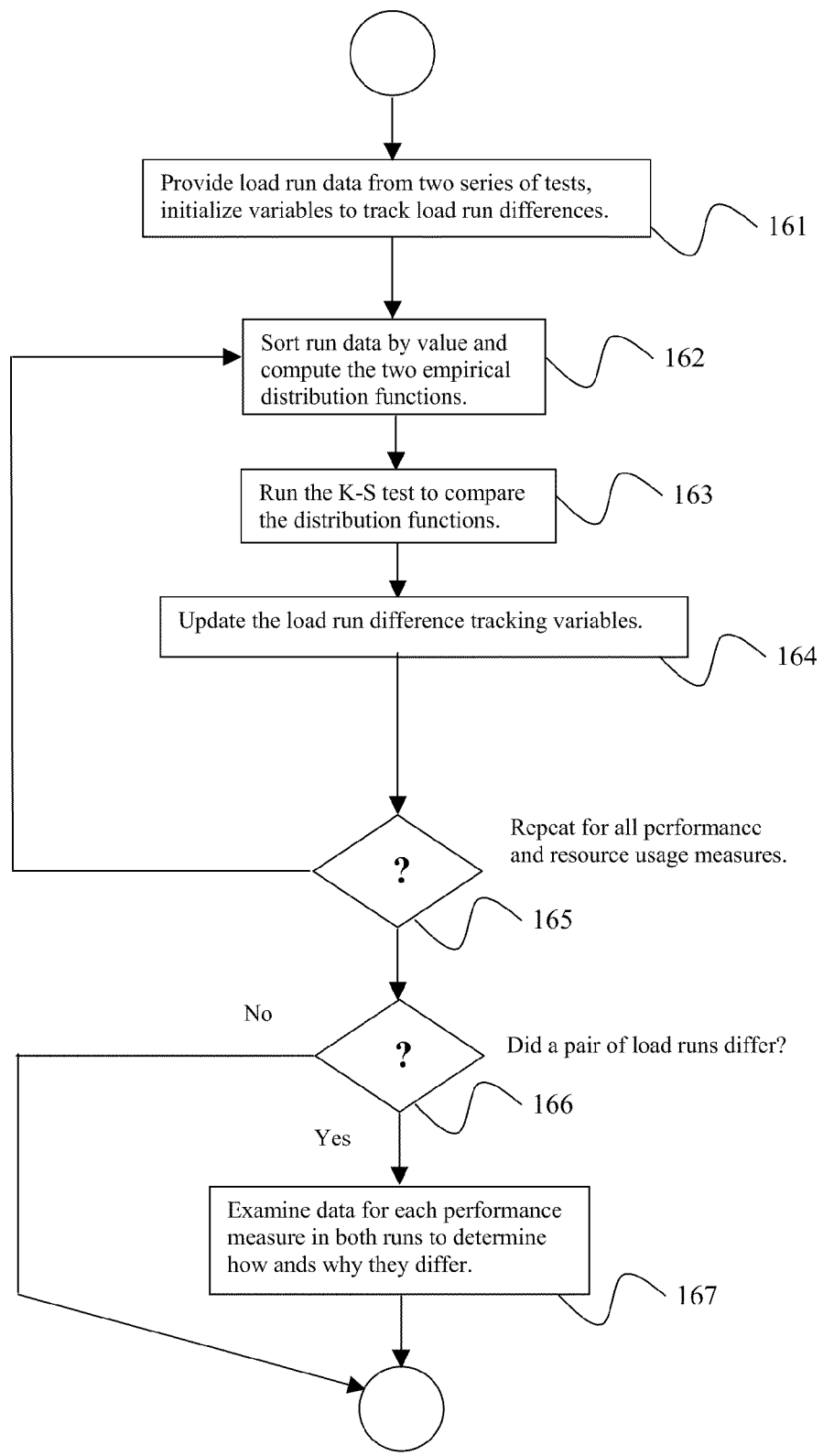
FIG. 16 is a flowchart of a procedure for comparing load runs, according to an embodiment of the invention.

FIG. 16 is a flowchart of a procedure for comparing load runs, according to an embodiment of the invention. Referring now to the flowchart, a procedure begins at step 161 by providing the load run test data from the two series of load run tests, and initializing one or more variables that track whether the runs are different. According to an embodiment of the invention, two exemplary, non-limiting Boolean variables that serve this purpose are RunsAreDifferent and ExamineMeasure[1:NumMeasures], where NumMeasures is the number of performance measures being evaluated, are both initialized to FALSE. Then, for each performance measure and resource usage measure collected, the data in both runs is sorted by measurement value and the resulting empirical distribution functions are computed at step 162. At step 163, the K-S test is run to compare the distribution functions. At step 164, the tracking variables are updated based on the K-S test results. An exemplary, non-limiting updating according to an embodiment of the invention is:

RunsAreDifferent:=RunsAreDifferent OR (K-S test indicates the runs are different),
and
ExamineMeasure[m]:=TRUE, where m identifies the particular performance measure for which the runs are different. The procedure loops back from step 165 to repeat steps 162, 163 and 164 for the other performance and resource usage measures. At step 166, it is tested whether any of the runs are different. An exemplary test according to an embodiment of the invention is RunsAreDifferent==TRUE. If true, at step 167, the data in the two runs for those individual performance measures whose runs differed is examined to determine how and why the runs differ. According to an embodiment of the invention, a performance measure m differed if the corresponding value of ExamineMeasure[m] is TRUE.

Applying an algorithm according to an embodiment of the invention to each pair of test runs at each load level for each use case reduces the need to manually examine data for which the load test results are essentially identical.

A method according to an embodiment of the invention can also be used to compare the outputs of discrete event simulations in which the sequences of inter-arrival times and service times for entities arriving in the same order before and after a modification are kept the same using the method of common random numbers.

Up to now, the outputs of load tests have usually been compared manually. These outputs can include many (perhaps twenty or thirty) series of performance measures per host under test. In systems with large numbers of hosts and use cases, manual evaluation of the outputs of tests with, for instance, different scheduling algorithms or implementations in place, is prohibitively time consuming and expensive. An algorithm according to an embodiment of the invention, when used in conjunction with an automated load test analysis according to an embodiment of the invention, allows the automation of a large part of this effort.

System Implementation

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 17:
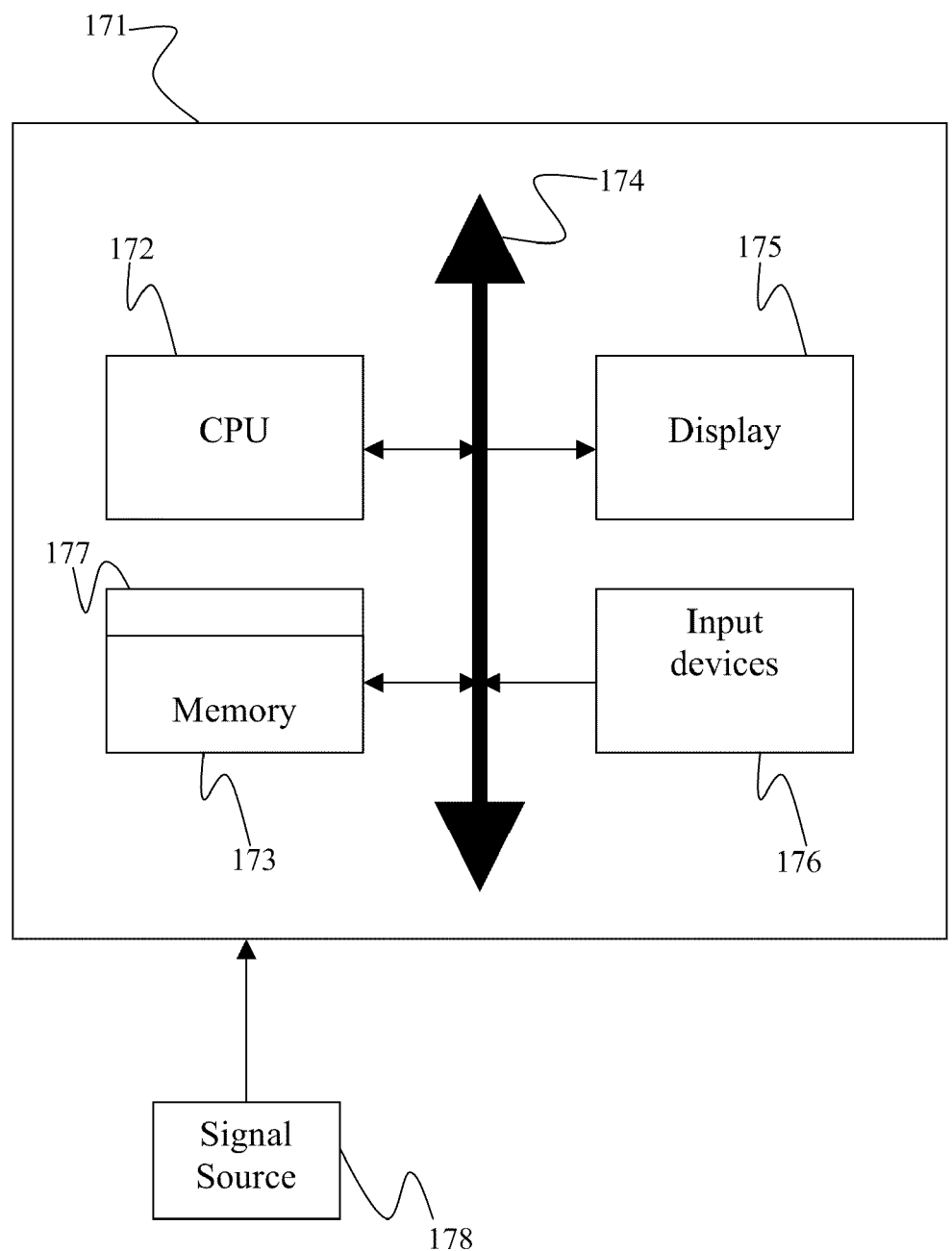
FIG. 17 is a block diagram of an exemplary computer system for implementing a method for automatically analyzing and comparing load test data on computer systems, according to an embodiment of the invention.

FIG. 17 is a block diagram of an exemplary computer system for implementing a method for automatically analyzing and comparing load test data on computer systems according to an embodiment of the invention. Referring now to FIG. 1-7, a computer system 171 for implementing the present invention can comprise, inter alia, a central processing unit (CPU) 172, a memory 173 and an input/output (I/O) interface 174. The computer system 171 is generally coupled through the I/O interface 174 to a display 175 and various input devices 176 such as a mouse and a keyboard. The support circuits can include circuits such as cache, power supplies, clock circuits, and a communication bus. The memory 173 can include random access memory (RAM), read only memory (ROM), disk drive, tape drive, etc., or a combinations thereof. The present invention can be implemented as a routine 177 that is stored in memory 173 and executed by the CPU 172 to process the signal from the signal source 178. As such, the computer system 171 is a general purpose computer system that becomes a specific purpose computer system when executing the routine 177 of the present invention.

The computer system 171 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer implemented method for analyzing load run test results of a computer system, the method performed by the computer comprising the steps of:

providing a plurality of performance measure sets derived from a first series of load run tests of a computer system performed over a same time period under a constant load, each said set comprising a plurality of records, each record having a timestamp and a value;

sorting performance measure records by value in ascending order, for each performance measure set;

determining whether said computer system has equilibrated under said load run tests by identifying plateau regions in said sorted performance measure sets, for each performance measure;

sorting performance measure records within each plateau region by time stamp in ascending order, for each performance measure;

identifying a single overlapping time interval covered by each plateau region for the plurality of performance measure sets, wherein said computer system has equilibrated if said performance measures have plateau regions in common; and computing averages of performance measures over the overlapping time intervals.

2. The method of claim 1, wherein identifying a plateau region in a sorted performance measure set comprises looking for an unbroken sequence of measurement values wherein estimates of a first derivative and a second derivative for each value in said sequence are close to zero in absolute value.

3. The method of claim 2, wherein a difference between a smallest value and a largest value of said measurement values in said unbroken sequence is small.

4. The method of claim 2, wherein said first derivative $\hat{f}'(x_n)$ at a measurement value $f(x_n)$ is estimated by the formula $$\hat{f}'(x_n) = \frac{1}{12}[f(x_{n-2}) - 8f(x_{n-1}) + 8f(x_{n+1}) - f(x_{n+2})], n \geq 2.$$

5. The method of claim 2, wherein said second derivative $\hat{f}''(x_n)$ at a measurement value $f(x_n)$ is estimated by the formula $$\hat{f}''(x_n) = [f(x_{n-1}) - 2f(x_n) + f(x_{n+1})].$$

6. The method of claim 2, wherein a measurement value for a first point $x_{n+1}$ in the plateau satisfies $|\hat{f}'(x_0)| < \epsilon_1$ and $|\hat{f}''(x_0)| < \epsilon_2$, wherein $\hat{f}'$, $\hat{f}''$ are first and second derivatives of the measurement values, respectively, and $\epsilon_1, \epsilon_2 > 0$.

7. The method of claim 6, wherein a measurement value for a subsequent point $x_{n+1}$ in the plateau satisfies $|\hat{f}'(x_{n+1})| < \epsilon_1$, $|\hat{f}''(x_{n+1})| < \epsilon_2$, and $|f(x_{n+1}) - f(x_n)| < \epsilon_3$, for $\epsilon_i > 0$, i=1, 2, 3.

8. The method of claim 7, further comprising excluding a point from said plateau, if a first derivative evaluated for said point is negative.

9. The method of claim 1, wherein identifying overlapping time intervals covered by said plateau regions comprises, if a measurement value for an interval is missing for one performance measure, discarding corresponding measurement values for other performance measures, computing averages of performance measures over a largest set for which all measurement values are present and sufficiently close together, wherein chronologically successive measurement values within the plateau sets of the different performance measures are deemed to be sufficiently close together if said measurement values are no more than kδ apart, where k is a small positive integer and δ is a length of measurement intervals.

10. The method of claim 1, wherein said performance measures are based on rates, sample statistics, and time-averaged quantities.

11. The method of claim 10, wherein said performance measures include processor utilization, bandwidth utilization, memory occupancy, throughput and transaction response time.

12. The method of claim 1, further comprising:

providing one or more performance measure sets derived from a second series of load run tests performed after modifying said computer system, said second series of load run tests being performed over the same time period duration and under the same load conditions as said first series of load run tests;

for each performance measure in said second series of load run tests, sorting measurement values of each said performance measure from said first series load run test and from said second series load run test by value;

computing a first and second empirical distribution function for said first and second set of sorted data;

comparing the first and second empirical distribution functions using a Kolmogorov-Smirnov test; and identifying those pairs of runs that are different according to the Kolmogorov-Smirnov test as needing further investigation.

13. The method of claim 2, wherein said empirical distribution function is defined by $F(x)=i/n$ if $x(i) \leq x$, $x(i+1) > x$ and $i=1, 2, \ldots, n-1$, and $f(x)=1$ if $x \geq x(n)$, wherein n is a number of measurement values.

14. The method of claim 1, wherein identifying overlapping time intervals covered by said plateau regions comprises constructing a tree ordered by timestamps at intervals corresponding to those at which the performance measures were collected, wherein each leaf node of said tree contains the time stamp and a list of records including names of those performance measures whose values lie on respective plateaus and the corresponding values themselves, internal nodes contain time stamps within the equilibrium intervals at the leaf nodes, and wherein the set of values belonging to each time stamp are treated as belonging to the equilibrium interval if the associated list of records contains all performance measures of interest, and if the list of records at the neighboring leaves also contain all performance measures of interest.

15. A non-transitory program storage device readable by a computer, tangibly embodying a program of instructions executable by the computer to perform the method steps for analyzing load run test results of a computer system, the method comprising the steps of:

providing a plurality of performance measure sets derived from a first series of load run tests of a computer system performed over a same time period under a constant load, each said set comprising a plurality of records, each record having a timestamp and a value;

sorting performance measure records by value in ascending order, for each performance measure set;

determining whether said computer system has equilibrated under said load run tests by identifying plateau regions in said sorted performance measure sets, for each performance measure;

sorting performance measure records within each plateau region by time stamp in ascending order, for each performance measure;

identifying a single overlapping time interval covered by each plateau region for the plurality of performance measure sets, wherein said computer system has equilibrated if said performance measures have plateau regions in common;

and computing averages of performance measures over the overlapping time intervals.

16. The computer readable program storage device of claim 15, wherein identifying a plateau region in a sorted performance measure set comprises looking for an unbroken sequence of measurement values wherein estimates of a first derivative and a second derivative for each value in said sequence are close to zero in absolute value.

17. The computer readable program storage device of claim 16, wherein a difference between a smallest value and a largest value of said measurement values in said unbroken sequence is small.

18. The computer readable program storage device of claim 16, wherein said first derivative $\hat{f}'(x_n)$ at a measurement value $f(x_n)$ is estimated by the formula $$\hat{f}'(x_n) = \frac{1}{12}[f(x_{n-2}) - 8f(x_{n-1}) + 8f(x_{n+1}) - f(x_{n+2})], n \geq 2.$$

19. The computer readable program storage device of claim 16, wherein said second derivative $\hat{f}''(x_n)$ at a measurement value $f(x_n)$ is estimated by the formula $$\hat{f}''(x_n)=[f(x_{n-1})-2f(x_n)+f(x_{n+1})].$$

20. The computer readable program storage device of claim 16, wherein a measurement value for a first point $x_0$ in the plateau satisfies $|\hat{f}'(x_0)|<\epsilon_1$ and $|\hat{f}''(x_0)|<\epsilon_2$, wherein $\hat{f}'$, $\hat{f}''$ are first and second derivatives of the measurement values, respectively, and $\epsilon_1$, $\epsilon_2>0$.

21. The computer readable program storage device of claim 20, wherein a measurement value for a subsequent point $x_{n+1}$ in the plateau satisfies $|\hat{f}'(x_{n+1})|<\epsilon_1$, $|\hat{f}''(x_{n+1})|<\epsilon_2$, and $|f(x_{n+1})-f(x_n)|<\epsilon_3$, for $\epsilon_i>0$, i=1, 2, 3.

22. The computer readable program storage device of claim 21, the method further comprising excluding a point from said plateau, if a first derivative evaluated for said point is negative.

23. The computer readable program storage device of claim 15, wherein identifying overlapping time intervals covered by said plateau regions comprises, if a measurement value for an interval is missing for one performance measure,
discarding corresponding measurement values for other performance measures,
computing averages of performance measures over a largest set for which all measurement values are present and sufficiently close together,
wherein chronologically successive measurement values within the plateau sets of the different performance measures are deemed to be sufficiently close together if said measurement values are no more than $k\delta$ apart, where k is a small positive integer and $\delta$ is a length of measurement intervals.

24. The computer readable program storage device of claim 15, wherein said performance measures are based on rates, sample statistics, and time-averaged quantities.

25. The computer readable program storage device of claim 24, wherein said performance measures include processor utilization, bandwidth utilization, memory occupancy, throughput and transaction response time.

26. The computer readable program storage device of claim 15, the method further comprising:
providing one or more performance measure sets derived from a second series of load run tests performed after modifying said computer system, said second series of load run tests being performed over the same time period duration and under the same load conditions as said first series of load run tests;
for each performance measure in said second series of load run tests, sorting measurement values of each said performance measure from said first series load run test and from said second series load run test by value;
computing a first and second empirical distribution function for said first and second set of sorted data;
comparing the first and second empirical distribution functions using a Kolmogorov-Smirnov test; and
identifying those pairs of runs that are different according to the Kolmogorov-Smirnov test as needing further investigation.

27. The computer readable program storage device of claim 26, wherein said empirical distribution function is defined by $F(x)=i/n$ if $x(i)\leq x$, $x(i+1)>x$ and i=1, 2, ..., n−1, and $f(x)=1$ if $x\geq x(n)$, wherein n is a number of measurement values.

28. The computer readable program storage device of claim 15, wherein identifying overlapping time intervals covered by said plateau regions comprises constructing a tree ordered by timestamps at intervals corresponding to those at which the performance measures were collected, wherein each leaf node of said tree contains the time stamp and a list of records including names of those performance measures whose values lie on respective plateaus and the corresponding values themselves, internal nodes contain time stamps within the equilibrium intervals at the leaf nodes, and wherein the set of values belonging to each time stamp are treated as belonging to the equilibrium interval if the associated list of records contains all performance measures of interest, and if the list of records at the neighboring leaves also contain all performance measures of interest.

* * * * *